(12) United States Patent
DeMoor et al.

(10) Patent No.: US 7,466,959 B2
(45) Date of Patent: Dec. 16, 2008

(54) APPARATUS AND METHOD FOR IF SWITCHING IN A DUAL-TUNER, DUAL-IF, HD RADIO AND FM/AM RADIO RECEIVER

(75) Inventors: Robert G. DeMoor, Sugar Land, TX (US); John E. Whitecar, Plymouth, MI (US)

(73) Assignee: Texas Instruments Incorporated, Dallas, TX (US)

( * ) Notice: Subject to any disclaimer, the term of this patent is extended or adjusted under 35 U.S.C. 154(b) by 362 days.

(21) Appl. No.: 11/171,613

(22) Filed: Jun. 30, 2005

(65) Prior Publication Data
US 2007/0004335 A1 Jan. 4, 2007

(51) Int. Cl.
*H04B 1/68* (2006.01)

(52) U.S. Cl. .................. 455/47; 455/48; 455/228; 455/203; 455/178.1; 455/165.1; 455/224; 348/738; 348/441; 348/399; 369/44.41; 369/44.34

(58) Field of Classification Search .............. 455/47, 455/48, 228, 165.1, 224; 369/44.34, 44.41; 348/400, 738, 399
See application file for complete search history.

(56) References Cited

U.S. PATENT DOCUMENTS

| | | | | | |
|---|---|---|---|---|---|
| 5,103,295 | A | * | 4/1992 | Uwabata et al. | 348/556 |
| 5,283,653 | A | * | 2/1994 | Citta | 348/725 |
| 5,818,530 | A | * | 10/1998 | Canfield et al. | 348/400.1 |
| 5,825,424 | A | * | 10/1998 | Canfield et al. | 375/240.15 |
| 6,067,123 | A | * | 5/2000 | Lee | 348/554 |
| 6,204,884 | B1 | * | 3/2001 | Lee | 348/555 |
| 6,330,344 | B1 | * | 12/2001 | Kondo et al. | 382/107 |
| 6,519,298 | B1 | * | 2/2003 | Kim | 375/343 |
| 6,633,325 | B1 | * | 10/2003 | Lee | 348/21 |
| 6,661,855 | B2 | * | 12/2003 | Kim | 375/343 |
| 6,937,677 | B2 | * | 8/2005 | Strolle et al. | 375/347 |
| 6,970,523 | B2 | * | 11/2005 | Strolle et al. | 375/345 |
| 6,987,539 | B2 | * | 1/2006 | Kondo et al. | 348/441 |
| 2004/0132422 | A1 | * | 7/2004 | Cowley et al. | |

* cited by examiner

*Primary Examiner*—Marceau Milord
(74) *Attorney, Agent, or Firm*—Wade J. Brady, III; Frederick J. Telecky, Jr.

(57) ABSTRACT

In a dual-channel HD radio receiver, when the broadband filter channel is compromised, the broadband channel is inactivated and the narrowband channel is activated. By mixing the signals of the two channels during the change, undesirable audio artifacts can be minimized.

16 Claims, 2 Drawing Sheets

APPARATUS AND METHOD FOR IF SWITCHING IN A DUAL-TUNER, DUAL-IF, HD RADIO AND FM/AM RADIO RECEIVER

BACKGROUND OF THE INVENTION

1. Field of the Invention

This invention relates generally to radio receivers and, more particularly to high definition (HD) radio receivers.

2. Background of the Invention

Referring to FIG. 1, the structure of a high definition (HD) radio signal is illustrated. The center frequency band 10 is typically an analog signal and the sideband signals 11A and 11B are typically digital signals. In the following discussion, narrowband and broadband regions are indicated. A narrowband region has the frequency range to include only the center frequency band 10, while the broadband region is sufficiently wide to include the center frequency band 10 and the sidebands 11A and 11B. In the HD radio system, the program information is transmitted in the center band frequency spectrum, while related information, including possibly a simulcast, is transmitted by the sidebands.

After receiving a broadcast signal, the frequency of the received signal is down-converted by mixing the broadcast signal with a local oscillator to generate an intermediate frequency (IF) signal. An HD radio receiver typically employs a 180 kHz "narrowband" IF filter when the analog FM signal is being received. The narrowband filter is used to minimize desensitization of the FM signal resulting from out-of-band interference signals. The HD radio receiver must use a 550 kHz "wideband" IF filter when an HD radio station is received in order that the digital sidebands of the HD radio signal will fall within the bandwidth of the IF filter. The sidebands of the HD radio signal would otherwise fall outside of the bandwidth of the narrowband filter, which is optimum only for the bandwidth of analog FM signal. Typically, switching is provided between the wideband and the narrowband IF filters when attempting to detect the acquisition or loss of the HD radio signal. Furthermore, when an analog FM signal is being received, the receiver should "hunt" for the digital sidebands of the HD radio signal bands by periodically switching from the narrowband IF filter to the wideband IF filter. When no HD radio sidebands are detected, then the receiver should switch back to the narrowband IF filter.

Unfortunately, the switching between narrow band and wideband IF filters is not without problems. For instance, when the receiver switches from the narrowband IF filter to the wideband IF filter to hunt for the HD sidebands, the analog signal can be desensitized by adjacent noise falling within the bandwidth of the wideband filter. In more detail, a strong interference signal falling within the bandwidth of the wideband filter can cause the AGC (automatic gain control) function within the tuner to reduce the gain of the IF signal. The result is a reduction of the SNR (signal-to-noise ratio) of the desired signal in the presence of a strong interfering signal. To the person listening to the radio, the effect is a periodic disturbance in the audio, similar to a burst of noise.

Some systems employ two IF signal paths to avoid this problem. One path is filtered by the wideband filter and the other path is filtered by a narrowband IF filter. Since the two paths are independent, no filter switching is required and the audio is not disturbed when the receiver hunts for the digital sidebands of the HD radio signal. A system with two IF signal paths is more expensive than a system with only one IF signal path because a high quality ADC is required to digitize both IF signals. Two high quality ADCs require additional expense.

However, many automotive radio receiver manufacturers use a dual-tuner apparatus to improve the quality of the analog radio signals. This approach is independent of the HD radio and does not apply to the reception of the HD radio signals. The dual tuner (also called tuner diversity) technique mixes the signals from two tuners, each fed by a separate antenna input, usually from spatially distant areas on the vehicle, to form a combined signal with higher quality than either of the two individual signals alone. Since a dual-tuner receiver requires two IF paths (and two tuners), it is more expensive than a single-tuner system.

Referring to FIG. 2, the implementation of the HD radio receiver 20 according to the prior art is shown. In a first path, an antenna 21 receives the HD radio signal. This signal is applied to a tuner 22, including broadband filter 221, narrowband filter 222 and switch 223. The signal from tuner 22 is applied to digitizer 24. The output signal from digitizer 24 is applied to the digital signal processor (DSP) 25 wherein the signal is processed and applied to loudspeaker 26. A second HD radio signal path includes antenna 21', tuner 22', tuner 21' including narrowband filter 222; and digitizer 24' before being applied to digital signal processor 25. Switch 223 includes apparatus for determining when the signal in the broadband filter signal has been compromised and switches the signal applied to the digital signal processor to the signal from the narrowband filter. When the signal in the broadband filter path is no longer compromised, the signal applied to the digital signal processor by the digitizer 24 is signal from the broadband filter path. In the processor 25, the higher quality center frequency band signal from digitizer 24 and digitizer 24' is applied to speaker 25'.

Referring to FIG. 3, a second implementation of the prior art HD radio receiver is shown. In this implementation, the output signals from the broadband filter tuner 321 or the narrowband filter tuner 322 are selected by switch 323 and applied to digitizer 34. The digitized signal is applied to the digital signal processor 35 and then to the speaker 36. When the signal through the broadband filter 321 is comprised, only the signal from the narrowband filter tuner 322' is applied to the digital signal processor 36.

The HD radio reception capability is being added to high-quality radios that use the dual tuner technique for improved reception of the analog FM signal. If only two IF paths are used in such a system, the system will suffer from periodic disturbances in the audio output signals resulting from the switching the wideband and narrow band filters in one of the tuner paths while it hunts for the digital sidebands of the HD radio signal. The problem could be solved by adding a third IF path, but at an increased cost.

Summarizing, the HD radio receiver will typically process the signal passing through the broadband filter tuner. In this manner, the center frequency bands and the sidebands are processed. When the signal through the broadband tuner is degraded, the signal from the narrowband filter tuner is processed. This transition can result in an undesirable audio output resulting from rapid transients.

A need has therefore been felt for apparatus and an associated method having the feature of improving the audio output signal of a HD radio receiver. It would be yet another feature of the apparatus and associated method to improve the switching between a narrowband filter signal path and broadband filter signal path on the audio output signal.

SUMMARY OF THE INVENTION

The foregoing and other features are accomplished, according the present invention, by using the baseband DSP to mix the signal paths from the two tuners such that the signal path being affected by the IF switching is minimized during the IF switching events. The DSP will mix 100% of the signal filtered only by the narrowband IF filter with 0% of the signal that is being switched between the narrow band and-wideband IF filters during the duration of each period of hunting for the digital sidebands of the HD radio signal. Furthermore, the DSP can use the alternate frequency (AF) signal flag, which is available in many high-quality tuners supporting radio data services (RDS) to synchronize the hunt for the digital sidebands of the HD radio signal with silent period in the content of the audio stream, the technique will further mask any possible loss of signal quality during the periods when the DSP's tuner diversity algorithm is selecting only the signal filtered by the narrowband IF tuner.

Other features and advantages of present invention will be more clearly understood upon reading of the following description and the accompanying drawings and the claims.

DESCRIPTION OF THE PREFERRED EMBODIMENT

1. Detailed Description of the Figures

Figure 1:
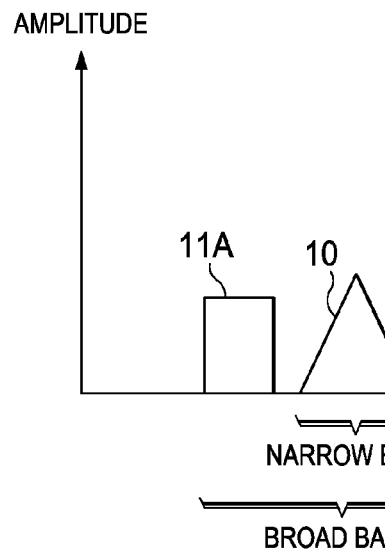
FIG. 1 illustrates a typical HD radio broadcast band.
Figure 2:
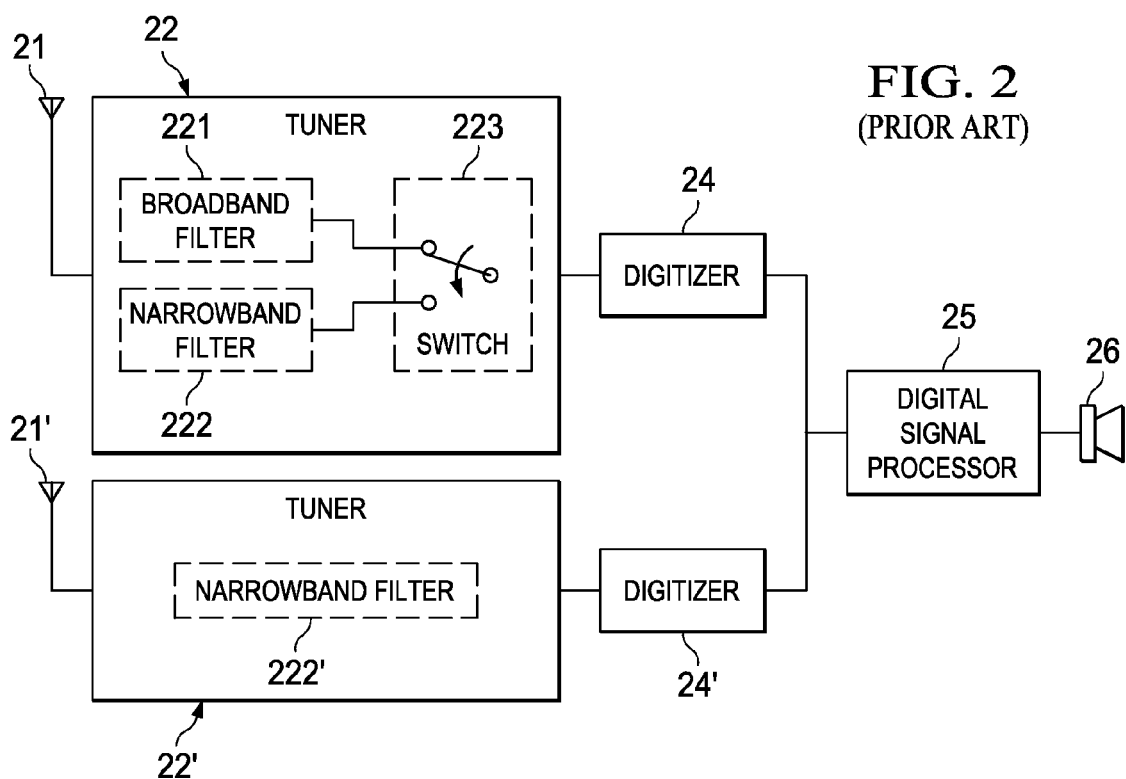
FIG. 2 is a block diagram of a HD radio receiver according to the prior art.
Figure 3:
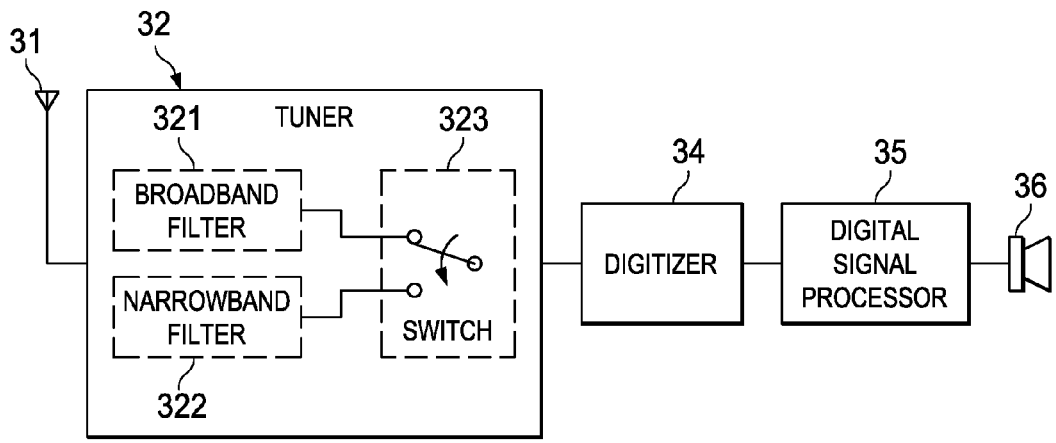
FIG. 3 is block diagram of a second HD radio receiver according to prior art.

FIGS. 1-3 have been discussed with respect to the related art.

Figure 4:
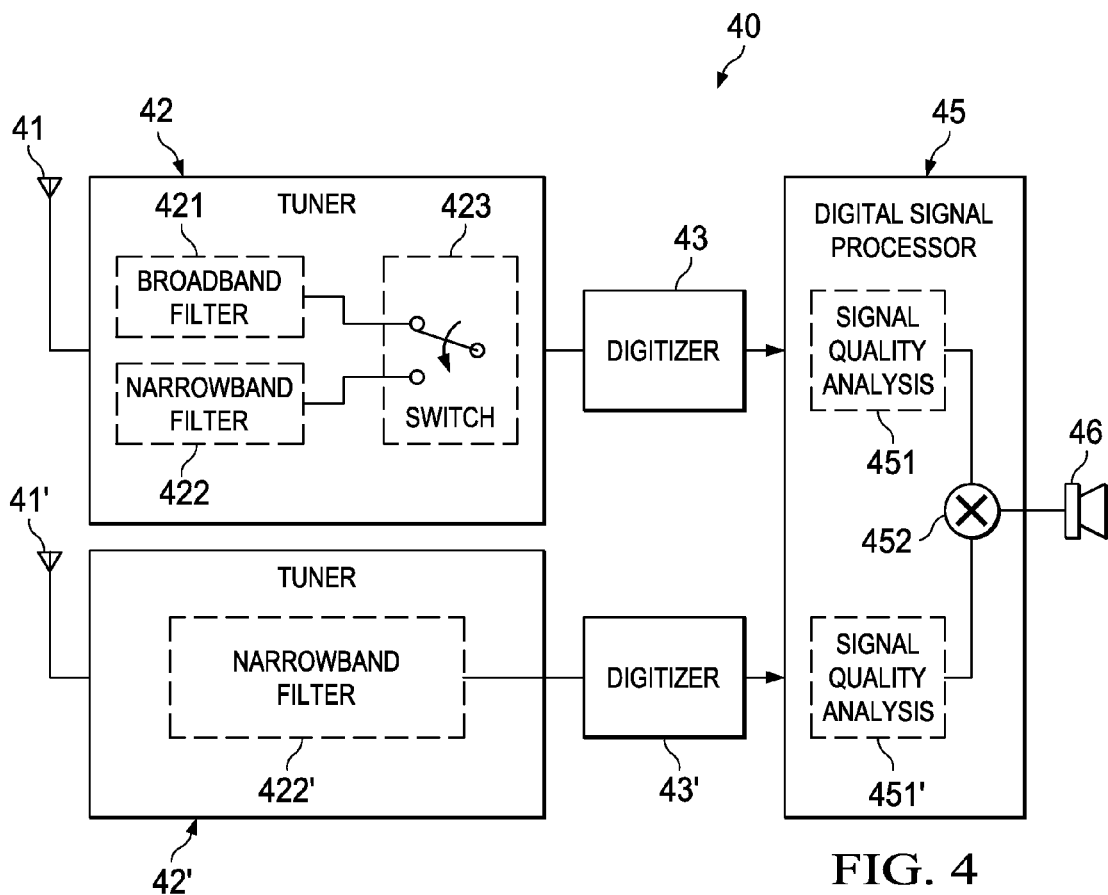
FIG. 4 is a block diagram of an HD radio receiver according to the prior art.

Referring to FIG. 4, a block diagram of an HD radio receiver 40 according to the prior art is shown. The HD receiver has a tuner 42 including a broadband filter 421 and a narrowband filter 422 and a switch 423, and digitizer 43 signal path and a tuner 42' including narrowband filter 422' and digitizer 43' signal path. The output signals from the digitizer 44 and digitizer 44' are applied to digital signal processor 45. The output signal from digitizer 43 is analyzed for signal quality by process 451 while the output signal from digitizer 43' is analyzed for signal quality by DSP process 451'. The output of the switch programs 451 and 451' are applied to DSP mixer process 452. The output signal of mixer process 452 is applied to speaker 460.

2. Operation of the Preferred Embodiment

The HD radio receiver has two channels/signal paths. In normal operation, the broadband filter channel signals are processed and applied to the speaker. The broadband channel includes sidebands which are processed along with the center frequency band. When interference or some other process renders the broadband filter channel too noisy, the output signal is changed to the narrowband filter channel, the narrowband filter channel processing only the center frequency band frequency signals. When the broadband channel has acceptable parameters, the HD radio receiver returns to processing the signal in the broadband channel. To avoid undesirable audio artifacts during the switching, the narrowband filter channel and the broadband filter channel are mixed with varying ratios to avoid an abrupt change from one channel to the other channel; the signals from the two channels are mixed during the transition. As a result of the mixing of the signals of the two channels, no audio artifacts are generated as a result of an abrupt change between the two channels.

In the preferred embodiment, the detection of the compromised broadband filter channel, as well as the recovery of a formally compromised signal is determined by the processing in the digital signal processor. Similarly, the variable mixing of the signals from the two channels is provided by procedures in the digital signal processor. As will be clear, this processing could be done by dedicated apparatus not incorporated in the digital signal processor.

The mixing of the broadband channel signals and the broadband channel signals can be performed in a continuous manner by programming the mixing to vary the ratio of the two components in a quasi-continuous manner. By a systematic mixing procedure, the noise generated by an abrupt transfer from one channel to the other channel can be avoided.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A receiver comprising:
a broadband filter channel of a first tuner coupled to a first antenna, the broadband filter channel including a broadband filter and a first narrowband filter for processing center frequency band signals along with associated sideband signals;
a narrowband filter channel of a second tuner coupled to a second antenna, the narrowband channel including a second narrowband filter for processing center frequency band signals; and
a mixer responsive to parameters of the signals processed by the broadband filter channel for combining predetermined ratios of the signals processed by the broadband filter channel and the signals processed by the narrowband filter channel to provide a gradual transition therebetween and avoid an undesired audio artifact associated with a transition between the first narrowband filter and the broadband filter.

2. The receiver as recited in claim 1 wherein the receiver is a high definition radio receiver.

3. The receiver as recited in claim 1 wherein the parameters indicate the degradation of the signals processed by the broadband filter channel.

4. The receiver as recited in claim 1 wherein the center frequency band signals are analog signals.

5. The receiver as recited in claim 4 wherein the sideband signals are digital signals.

6. A method for switching between broadband filter signals and narrow filter signals, the method comprising:
receiving a broadband signal at a first antenna coupled to a first tuner having a broadband filter and a first narrowband filter;
receiving a narrowband signal at a second antenna coupled to a second tuner having a second narrowband filter;
generating a broadband filter signal from the broadband signal received at the first antenna;
generating a narrowband filter signal from the narrowband signal received at the second antenna;
upon an identification of selected parameters in the broadband filter signal, altering a mixture of amounts of the narrowband filter signal and the broadband filter signal to provide a gradual transition therebetween and avoid an undesired audio artifact associated with a transition between the broadband filter and the first narrowband filter.

7. The method as recited in claim 6 further comprising:
when the narrowband filter signal is initially active, increasing an amount of the broadband filter signal in the mixture; and
when the broadband filter signal is initially active, increasing an amount of the narrowband filter signal in the mixture.

8. The method as recited in claim 7 wherein the increasing-steps are implemented in a mixer of a digital signal processing unit.

9. The method as recited in claim 6 wherein the radio receiver is a high definition radio receiver.

10. The method as recited in claim 9 wherein the narrowband signal includes analog center band signals.

11. The method as recited in claim 10 wherein the broadband filter signal includes analog center band signals and digital sideband signals.

12. The method as recited in claim 6 wherein the selected parameters determine an amount of degradation in the broadband filter signal.

13. A high definition dual channel radio receiver, the receiver comprising:

a broadband filter channel including a broadband filter and a first narrowband filter, the broadband filter channel processing broadband signals at a first tuner received at a first antenna;

a narrowband filter channel including a second narrowband filter, the narrowband filter channel processing narrowband signals at a second tuner received at a second antenna; and a digital signal processor, the digital signal processor changing between the broadband and the narrowband signals in response to selected parameters, the digital signal processor systematically mixing the broadband and the narrowband signals during the change between signals to provide a gradual transition between the broadband and the narrowband signals and avoid an undesired audio artifact associated with a transition between the broadband filter and the first narrowband filter.

14. The receiver as recited in claim 13 wherein the selected parameters indicate a degradation in the processed broadband signals.

15. The receiver as recited in claim 13 wherein the narrowband signals include analog center frequency band signals and the broadband signals include analog center frequency signals and sideband signals.

16. The receiver as recited in claim 13 wherein each channel includes a digitizer.

\* \* \* \* \*